United States Patent
Hines, Jr.

(10) Patent No.: US 7,334,822 B1
(45) Date of Patent: Feb. 26, 2008

(54) BIMINI TWIST KNOT TYING DEVICE

(76) Inventor: Robert S. Hines, Jr., 150 Roller Rd., Unicoi, TN (US) 37692

( * ) Notice: Subject to any disclaimer, the term of this patent is extended or adjusted under 35 U.S.C. 154(b) by 238 days.

(21) Appl. No.: 11/133,602

(22) Filed: May 20, 2005

Related U.S. Application Data

(60) Provisional application No. 60/572,936, filed on May 20, 2004.

(51) Int. Cl.
*A01G 59/04* (2006.01)

(52) U.S. Cl. .......................................... 289/2; 289/17

(58) Field of Classification Search ................ 289/1.2, 289/2, 17; 57/24
See application file for complete search history.

(56) References Cited

U.S. PATENT DOCUMENTS

| | | | | |
|---|---|---|---|---|
| 4,169,562 A | * | 10/1979 | Renzetti | 242/446 |
| 4,292,797 A | * | 10/1981 | Auger | 57/24 |
| 4,562,870 A | * | 1/1986 | Calvin | 140/149 |
| 4,871,200 A | * | 10/1989 | Ryder et al. | 289/17 |
| 5,169,079 A | * | 12/1992 | Renzetti | 242/446 |
| 5,194,063 A | * | 3/1993 | Kalm et al. | 493/381 |
| 5,809,686 A | * | 9/1998 | Abby | 269/69 |
| 6,401,442 B1 | * | 6/2002 | Root et al. | 57/27 |
| 7,011,346 B2 | * | 3/2006 | James, Sr. | 289/17 |

\* cited by examiner

*Primary Examiner*—Shaun R. Hurley

(57) ABSTRACT

A Bimini knot tying assist device having a line twister for twisting together in a pre-designed manner portions of a standing line section and a tag line section of a Bimini knot to form a twist or spiral segment, a movable compression element for axially, proximally, linearly compressing the segment and holding it at a predetermined axial distance from the twister, a slide structure for mounting the twister on an elongated support for allowing limited axial movement therealong of the twister during formation of the knot by an operator wherein the operator applies a forward pulling force on the line sections, and a retraction component connected to the support and to the twister for applying a retraction force to the twister against the forward pulling force applied by an operator to the line sections.

10 Claims, 4 Drawing Sheets

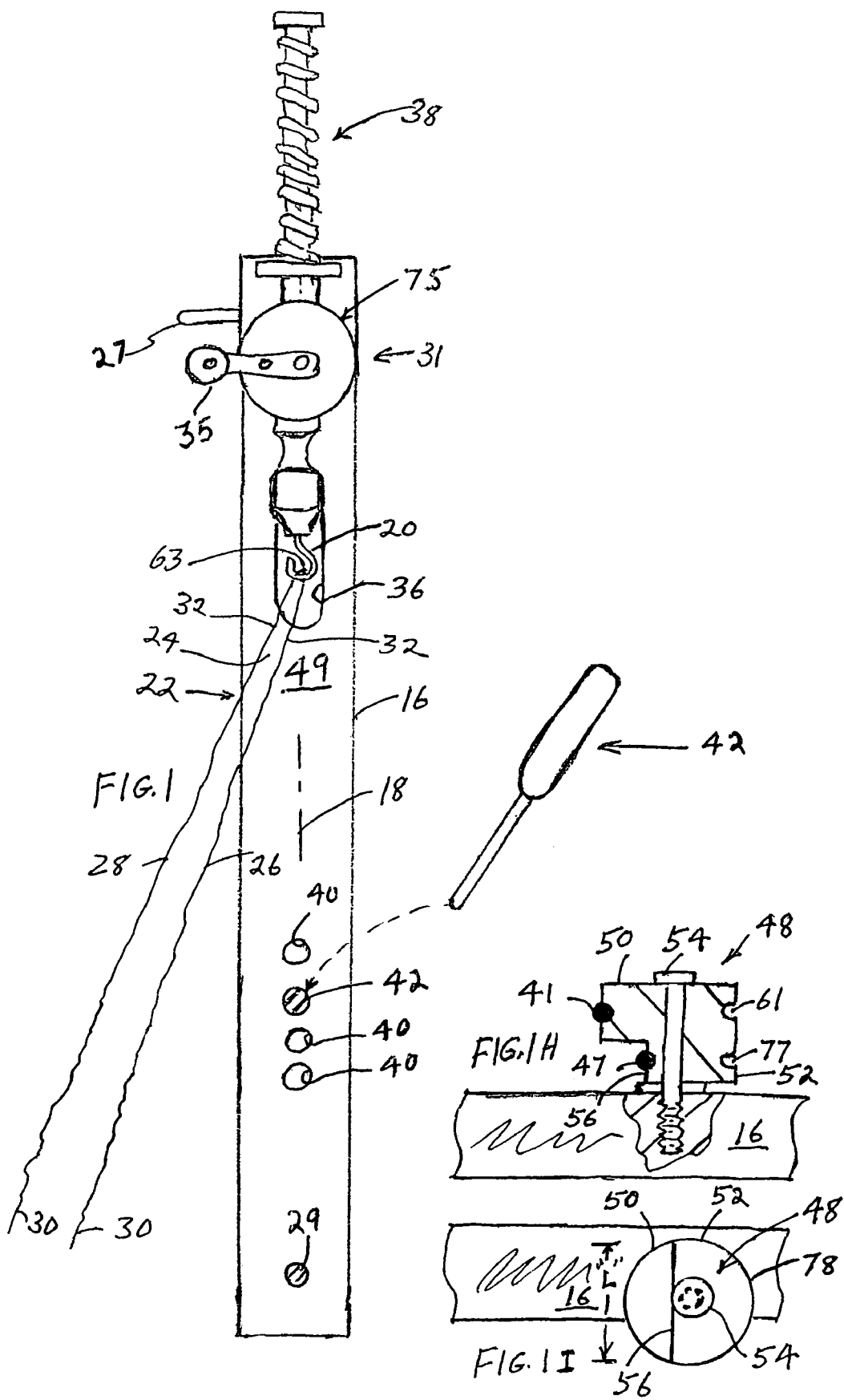

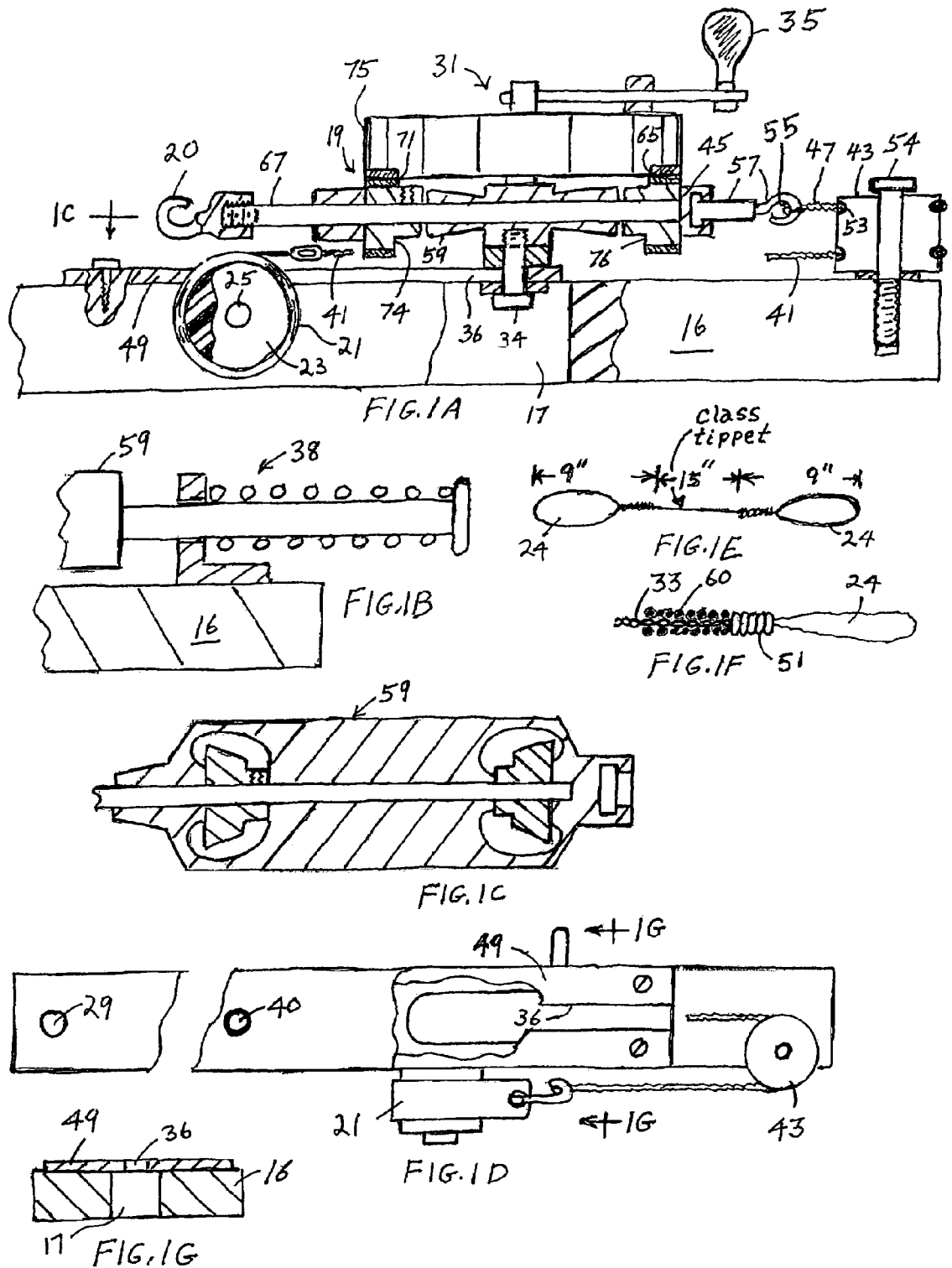

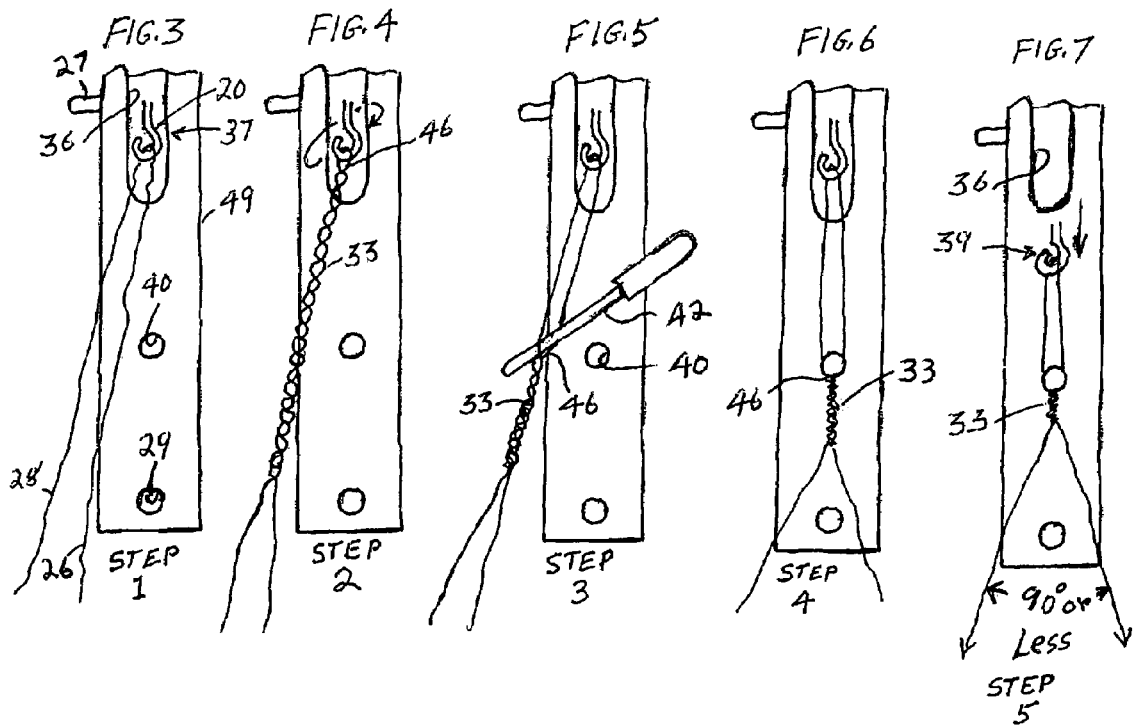
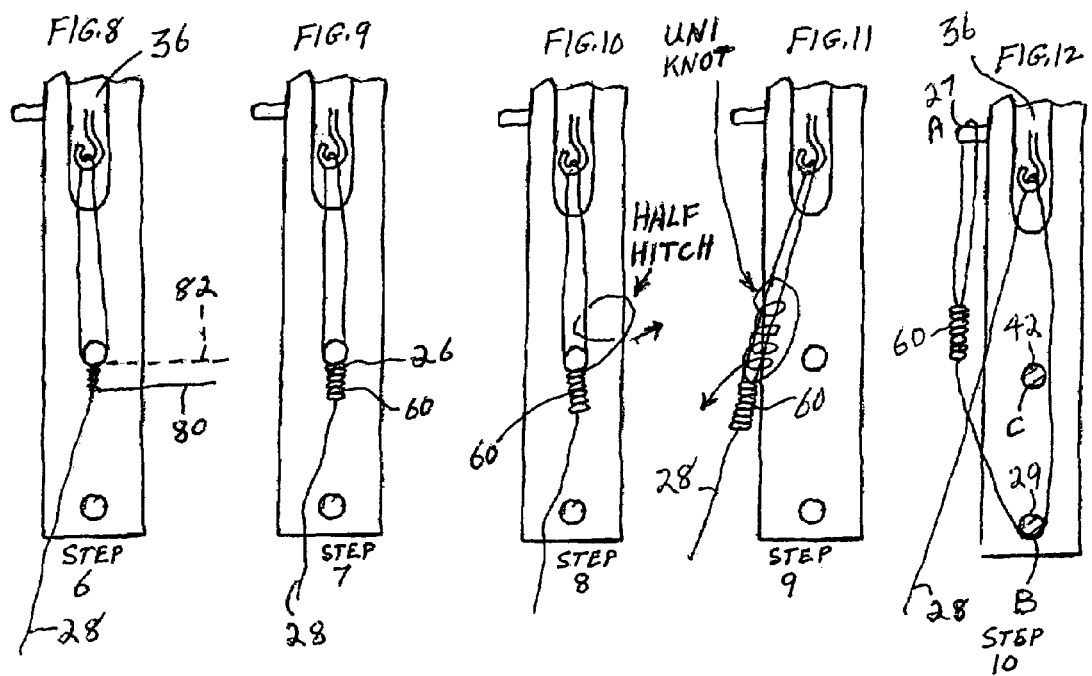

US 7,334,822 B1

BIMINI TWIST KNOT TYING DEVICE

This application claims priority under 35 U.S.C. 119(e)(1) based on Applicants Provisional U.S. Patent Application Ser. No. 60/572,936 filed May 20, 2004 and titled "BIMINI TWISTER".

BACKGROUND OF THE INVENTION

1. Field

The Bimini knot is generally employed as a pair of Bimini knots spaced apart a designated distance at the ends of a class tippet and is the backbone of fishing knots well known to the art of fishing knot tying, particularly in salt water application. It has 100% knot strength and is particularly immune to "shock" or sudden stretch forces because of its twisting spiral design. Each Bimini knot consists basically of two line sections, standing and tag, twisted together to form a linear spiral segment which is then wrapped with a tight coil of said tag section by unique hand manipulation of the tag section with simultaneous release of tension on the spiral segment, whereby the spiral segment can elongate, as a shock absorber, upon a strike. The knot is utilized widely and generally on both ends of a class tippet in fly fishing big game (Bill Fish, Tarpon, etc.). The International Game Fish Association dictates that class tippets must be 15" long (or greater) between the Bimini knots. Tying this knot skillfully and correctly as well as maintaining this 15" interval can be of great difficulty, particularly for the uninitiated.

2. Prior Art

Heretofore, such knots have been tied almost exclusively by hand manipulation and without the aid of any practical mechanical assist device.

The present mechanism makes tying the Bimini knot easier, more precise, allows for variable length loop and maintains the proper set distance between knots, which also may be predetermined and adjusted.

SUMMARY OF THE INVENTION

The present invention, in one of its preferred embodiment, is stated in broad terms as a Bimini knot tying assist device having a twisting or spiraling mechanism on which the loop apex of a fishing line can be placed, whereby with the operator holding and tensioning the standing and tag sections of the line, the mechanism can be actuated to twist the sections into a linear spiral of predesigned turns. A compression means is provided for linearly compressing the spiral into a linear spiral segment of initial predesigned length and for fixing the distance of the spiral segment from the loop apex. A retractable tensioning component provides predesigned tension forces to the line sections for allowing the operator to manipulate the line sections to properly compress the spiral segment to a finish length and to then form a coil of the tag section around the spiral segment.

BRIEF DESCRIPTION OF THE DRAWINGS

The invention will be understood further from the drawings and description thereof wherein the structures shown are not to scale or consistent proportions in the various figures, wherein certain portions of the structures and lines are enlarged for clarity, and wherein:

FIG. 1 is a top view of one embodiment of the present invention;

FIG. 1A is a side view with portions broken away for clarity, of a variation of the device of FIG. 1;

FIG. 1B is a side view of the distal end portion of the device of FIG. 1;

FIG. 1C is a cross-sectional view of the hand operated twisting means body (substantially equivalent to a hand operated drill) of FIG. 1 taken along line 1C-1C therein with the pinion gear affixed to and the idler gear rotatably mounted on the drive shaft;

FIG. 1D is a top down view of the support means of FIG. 1A with the twisting means removed;

FIG. 1E shows the general schematic structure of a Bimini knot class tippet and loops with typical dimensions noted;

FIG. 1F shows the linear spiral segment wrapped with the tag section coil, partly in cross-section;

FIG. 1G is a cross-sectional view taken along line 1G-1G in FIG. 1D and showing the slotted metal plate 49;

FIG. 1H is a side view of the cam pulley used alternatively in place of the idler pulley of FIG. 1;

FIG. 1I is a bottom view of the cam pulley of FIG. 1H;

FIGS. 3 through 12 are top views of portions of any of the embodiments of the present device described herein with explanations of the operating sequence of Bimini knot tying by use of the device.

Figure 2:
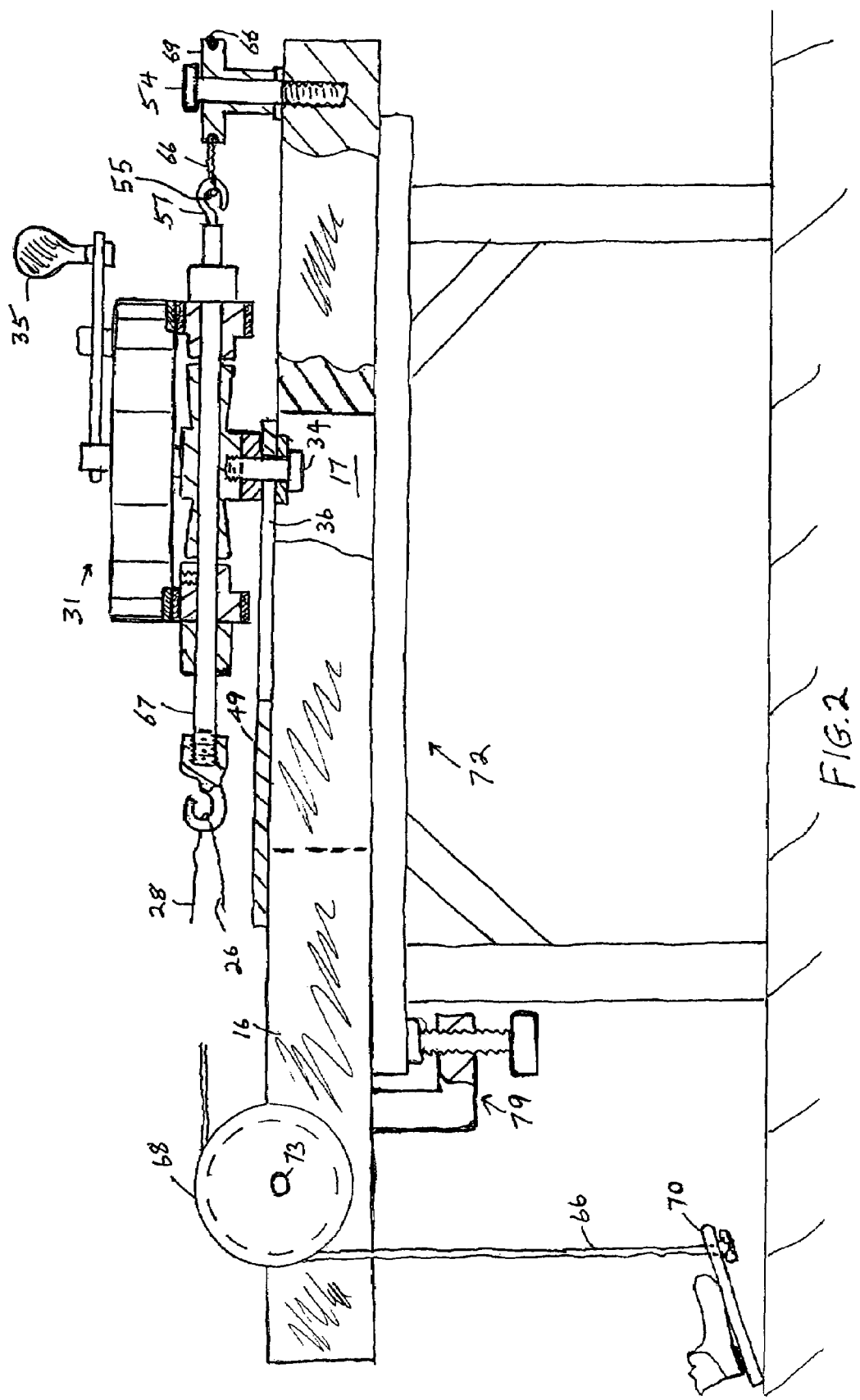
FIG. 2 is a longitudinal partial cross-sectional view of the device of FIG. 1A employing a foot treadle such that an operator can apply any desired retraction force to forward (toward proximal) motion of the twisting means during the knot tying operation.

Referring to the drawings and with reference to the claims herein, the present device, in one of its preferred embodiments, comprises an elongated support means 16 having a pull axis 18, and a hook member 20 on said support means over which a fishing line 22 can be hooked to form a standing section 28, a tag section 26, and a loop 24 having an apex 63 whereby the loop can be pulled taut against the hook member in a generally axial direction at chosen pull forces. The term hook member includes any structure over which a fishing line can be looped. Each line section has a proximal end portion 30 and a distal end portion 32.

A twisting means or twister generally designated 31 is mounted on the support means for rotating the hook member and twisting the distal end portions 32 about each other a desired number of turns while the proximal end portions 30 are being held substantially non-rotatively and pulled in said generally forward or axial direction by the operator to form a linear spiral or twist segment 33. Cooperating slide mounting structures 34, 36 are provided on said twisting means and support means respectively for allowing the twisting means to move a predetermined distance axially along the support means. Structure 34 is shown as a rod or post in FIG. 1A, and 36 is shown as a slot in FIG. 1A.

A retractable tensioning element generally designated 38 is mounted on the support means and engages the twisting means for regulating the linear sliding motion of the twisting means between a relaxed position 37 (FIG. 3) and a tensioned position 39 (FIG. 7). A shoulder means 40 such as a hole or recess is provided on said support means proximally removed from the twisting means in it relaxed position 37 a predetermined distance. Multiple such holes can be provided for length adjustment of tippet or loop. A compression means 42 such as a pin is adapted to be inserted into a distal end 46 of the twist 33 and axially proximally forced by the operator against the twist segment to linearly compress it to a desired degree in a proximal direction. This compressions means 42 is further adapted to engage the shoulder means 40 to temporarily secure the distal end 46 of the spiral segment in a fixed axial position on the support means while finishing steps of the knot tying operation are being performed, including tightening of the spiral segment and pulling of the twisting means in a distal to proximal direction. The tensioning element 38 is operable, when the tension on the line sections is relaxed by the operator or by the retraction component itself as described below, to allow the spiral segment to become partially unwound and allow a coil to form from the tag section around the spiral segment 33 to form a wrap segment 51.

An example of a tried and tested such tying device as shown basically in FIG. 1A comprises a rotatable hook 20 connected to a reduction geared twisting means 31 wherein the hook 20 and the gearing 19 slide along a slot 17 in support 16 in a linear fashion. Gearing 19 comprises a ring gear 75 rotatably mounted on body 59 and meshing at 65 with idler gear 76 rotatably mounted on shaft 67, and meshing with pinion gear 74 affixed to shaft 67, at 71. Gear 75 is rotatable by handle 35 affixed to 75. Substantially constant tension is applied to the hook and gear combination by means of a continuous force coil spring 21 mounted on a rotatable mandrel 23 mounted on a stud shaft 25 affixed to support 16 and connected by a cord or the like 41 encircling an idler pulley 43. An upper portion of the pulley is provided with a cord 47 around groove 53, the end 55 of which is connected to a hook 57 which is rotatably mounted on the distal end 45 of the twister body 59. This pulley is rotatably mounted on 16 by screw 54.

In a more preferred embodiment, pulley 43 can be eliminated and constant tension spring 21 can be mounted in the manner of 43 whereby spring 21 is directly attached to the rotatable hook member 57.

Roll stability of the twisting means 31 is maintained by a rod or post 34 protruding into linear slot 17 in support 16 and affixed to the body 59 of twisting means 31. The support 16 has two spacing pins 27,29 that ensure proper tippet length as the second Bimini knot is tied as in FIG. 12. Multiple pins 27 or 29 may be provided in order to accommodate tippet or loop dimensions as desired. These pins remain stationary during the tying procedure but may be reset to vary the Bimini loop length or knot to knot interval. Finally, holes 40 in the support 16 can removably receive pin 42 (compression means) that is used by the operator in (1) tightening the standard twenty spirals or twists 33 required for a Bimini Knot (2) in the partial untwisting of 33 while a wrap segment 51 of coil 60 around twist 33 is being created, and (3) in providing a stable post to secure the twist segment 33 and coil 60 in position while stabilizing the knot with a half hitch around one leg of the Bimini.

Other ways to modify this device include:
1. Compression spring replaced with constant tension spring;
2. Cammed pulley device (cam release) that delivers less tension at the terminus of the "pulling" rather than in the initial stage;
3. Geared/Hook mechanism is held stationary and the movable pin C (FIG. 12) is placed in a hole in a sliding device which is attached to an expansion spring in a manner equivalent to the structure of FIGS. 1 and 1A;
4. A foot operated treadle apparatus for manually applying retraction force to the twisting means 31.

The cam release and also the foot operated apparatus can be used with ultra slick tippets allowing more precise tension control on standing and tag ends, and can prevent "proximal coiling" or prevent the "twist" from converting to a coil at the moment the operator begins wrapping (forming) the coil around the twist 33.

In a most preferred embodiment of the above example, a tension release cam mechanism as shown in detail in FIGS. 1H and 1I was employed and functions to prevent "proxial coiling" of the spiral segment 33 itself at the moment the operator begins wrapping the tag section of the line around segment 33. This mechanism is a variation of the simple or idler pulley 43 of FIG. 1A and has a roller 48 having a circular section 50 and a semi-circular section 52 and being rotatably mounted by screw 54 to support means 16. The circular section 50 is encircled in groove 61 by cord 41 the end of which is affixed to section 50. Another cord 47 is wrapped around semi-circular section 52 in groove 77 and its end secured thereto such that as twisting means 31 is pulled near its most proximal position on support 16, cord 47 will fall off into cut-back 56 and substantially relieve, by about 50% or more without operator attention or participation, the pressure of pin 42 against the spiral segment 33 such that the aforesaid "proximal coiling" is prevented as the tag line is brought into coiling position.

It is noted that an approximately 270° rotation of section 52 will produce a substantially constant retraction force thru the first 180° and then a rapid automatic drop off in reaction force during the next 90° of rotation. In an actual tested working device, the circular section 50 of the cam pulley has a diameter of 1.75 in., a cut back length "L" of 1.75 in. on section 52, a "twister" 31 linear travel distance under constant tension of 4.0 in. before reaching the tension drop off point, and a total constant tension periphery 78 of the cam section 52 of 2.74 in.

In FIG. 2, a strictly manual retraction apparatus is shown wherein a foot treadle 70 operates a cord 66 mounted over a pulley 68 rotatably mounted by stud shaft 73 on support 16 and further mounted around a pulley 69 rotatable on screw bolt 54 and affixed to the hook means 57 as in FIG. 1A. A clamp such as 79 holds support 16 to a table 72 or the like for stability. An experienced operator in using this apparatus can adjust the tension on the line sections in a dynamic manner in accordance to the way he senses what tension is needed and at what moment in the tying process in order to tie the perfect Bimini knot, whether he wishes loosely or tightly packed coils and with any desired leader strength.

A description of steps 1-10 progressively shown in FIGS. 3-12 for forming a typical Bimini knot are as follows:

Step 1. The line is looped over the hook member 20 and its standing and tag ends are held by the operator under some tension during all of the steps 1-8.

2. The line is twisted 20 times by rotation of handle 35 an appropriate prescribed number of turns. For example 5¼ turns.

3. Movable pin 42 is inserted thru the loop and drawn toward hole 40.

4. Pin is inserted into hole 40.

5. Sufficient manual pull is exerted on the line ends to pull the hook and twisting means 31 forward (proximal direction) against the retraction force of spring 21 or its equivalent. The standing and tag ends must be held at an angle of less than 90° to prevent premature coiling of the tag end.

6. Move tag end to less than 90° to the side and gradually decrease the pull on standing and tag line sections allowing the tag to coil around the twist. The pull on the hook from the spring will partially untwist the loop allowing the coil around the twist to form. Maintain tension on standing and tag. The beginning position of the tag line is shown as 80 and the final position of the tag line is shown as 82.

7. Apply finger pressure to movable pin. The twist and spiral wrap are now secure.

8. Tie a half hitch around one line of the loop and draw tight. Then remove pin.
9. Knot is then finished in standard fashion.
10. To make a double ended class tippet loop as shown, repeat steps 2 thru 9 with the length of the tippet defined by the distance shown between pins A and B and C.

The invention has been described in detail with particular reference to preferred embodiments thereof, but it will be understood that variations and modifications will be effected with the spirit and scope of the invention.

I claim:

1. A Bimini Knot tying device comprising an elongated support having a pull axis, fishing line twisting means mounted on said support for movement along said axis, a hook member on said twisting means over which member a fishing line can be looped to form a standing line section and tag line section, whereby the loop can be pulled taut against said hook member generally in an axial direction at a regulated pull force, said line sections each having proximal and distal portions, said twisting means being operable to rotate said hook member and twist said distal portions about each other while said proximal portions are being held substantially non-rotatively and pulled in said generally axial direction by an operator to thereby form a twist segment of said line sections, cooperating mounting structures on said twisting means and support means respectively for allowing said twisting means to move a regulated distance axially within an axial distance range along said support means, retraction means on said device and connected to said twisting means for regulating the axial motion of said twisting means, shoulder means on said support means proximally removed from said twisting means a predetermined distance, and movable compression means adapted to be inserted through the distal end of said twist segment and axially proximally forced against said distal end to linearly compress said twist segment, said compression means further being adapted to engage said shoulder means to temporarily secure said distal end of said twist segment in a fixed axial position on said support means while finishing steps of the knot tying operation are being performed.

2. The device of claim 1 wherein said retraction means comprise a spring structure for resisting with a predetermined force linear axial motion of said twisting means in a proximal direction.

3. The device of claim 1 wherein said twisting means has a rotatable structure for generating twisting forces and includes reduction gearing structure to provide frictional resistance to reverse rotation of the twisting means during the knot tying operation.

4. The device of claim 3 wherein said twisting means comprises a hand operated drill type of structure having a pinion gear affixed to a rotatable drive shaft, a hand rotatable drive gear meshed with said pinion gear, and a hook structure on the output end of said drive shaft for releasably connecting to a loop in a fishing line.

5. The device of claim 1 wherein said compression means comprises a pin member, and said shoulder means comprises a hole in said support means for receiving said pin member and holding it in position.

6. The device of claim 1 wherein a stationary pin (27) is affixed to said support means at its distal end portion, and a stationary pin (29) is affixed to said support means at its proximal end portion, whereby said pins can receive looped portions of the standing and tag line sections for providing the exact line lengths needed for tying the second knot.

7. The device of claim 1 wherein said retraction means comprises a constant force coiled spring and a cam pulley means having a circular portion and a semi-circular portion providing a tension drop off shoulder, wherein a first cord is wrapped around said circular portion and is affixed to said spring, and wherein a second cord is wrapped around said semi-circular portion and is affixed to the tail end of said twisting means, whereby when said twisting means is pulled a predetermined axial distance along said support means said second cord will drop into said shoulder and relieve tension on the line sections.

8. The device of claim 1 removably affixed to a base wherein a foot operated treadle is provided and connected to said twisting means whereby an operator can provide any required retraction force to the twisting means as the knot is being tied by the operator, without the need for tensioning springs or the like.

9. The device of claim 1 wherein said retraction means comprises a constant tension coil spring mechanism wherein a free end of a spring portion is affixed to said hook member and a base portion is affixed rotatably to said support.

10. The device of claim 9 wherein said base portion is mounted distally of said twisting means and the free end of said spring is in substantial axial alignment with and affixed to said hook member.

\* \* \* \* \*